US008826613B1

(12) United States Patent
Chrien

(10) Patent No.: US 8,826,613 B1
(45) Date of Patent: Sep. 9, 2014

(54) UTILITY TRENCH SYSTEM COMPONENTS

(71) Applicant: David J Chrien, Shaker Heights, OH (US)

(72) Inventor: David J Chrien, Shaker Heights, OH (US)

(*) Notice: Subject to any disclaimer, the term of this patent is extended or adjusted under 35 U.S.C. 154(b) by 0 days.

(21) Appl. No.: 13/815,358

(22) Filed: Feb. 25, 2013

Related U.S. Application Data

(63) Continuation-in-part of application No. 29/395,617, filed on Feb. 29, 2012, now Pat. No. Des. 686,751, and a continuation-in-part of application No. 29/442,273, filed on Jan. 18, 2013, now Pat. No. Des. 705,446, and a continuation-in-part of application No. 29/442,274, filed on Jan. 18, 2013, now Pat. No. Des. 705,447, and a continuation-in-part of application No. 29/442,275, filed on Jan. 18, 2013, now Pat. No. Des. 710,032, and a continuation-in-part of application No. 29/442,276, filed on Jan. 18, 2013, now Pat. No. Des. 709,627.

(60) Provisional application No. 61/634,468, filed on Feb. 29, 2012.

(51) Int. Cl.
*E04C 2/52* (2006.01)
*E04B 5/48* (2006.01)

(52) U.S. Cl.
CPC ........................... *E04B 5/48* (2013.01)
USPC ............................. 52/220.5; 52/127.2; 52/383

(58) Field of Classification Search
USPC ............... 52/220.5, 220.7, 586.1, 127.2, 426, 52/383, 309.11, 220.1; 404/2, 3; 405/118
See application file for complete search history.

(56) References Cited

U.S. PATENT DOCUMENTS

| 1,085,429 | A | * | 1/1914 | Kahn et al. ....................... 52/838 |
| 2,305,955 | A | | 12/1942 | Dudley ........................... 210/164 |
| D193,927 | S | | 10/1962 | Prator ............................. D25/36 |
| 3,238,684 | A | * | 3/1966 | Wood ............................... 52/379 |
| 3,676,967 | A | * | 7/1972 | Frati ............................ 52/220.2 |
| 3,733,761 | A | | 5/1973 | Casto ............................ 52/220.5 |
| 3,912,408 | A | | 10/1975 | Domnick ......................... 404/35 |
| D246,384 | S | | 11/1977 | Brown et al. ................... D25/36 |
| 4,104,837 | A | * | 8/1978 | Naito ............................... 52/579 |
| 4,498,807 | A | | 2/1985 | Kirkpatrick et al. ............ 405/43 |
| 4,515,498 | A | | 5/1985 | Thomann et al. ................. 404/4 |

(Continued)

FOREIGN PATENT DOCUMENTS

| DE | 3602962 A1 * | 8/1987 | .............. E01C 11/22 |
| FR | 2700563 A3 * | 7/1994 | .............. E01C 11/22 |
| GB | 2234001 A * | 1/1991 | .............. E01C 11/22 |

OTHER PUBLICATIONS

Preform Trench Drain Co.—Photo Gallery Page—1 Page Downloaded From Website www.preformtrenchdrain.com Mar. 2011.

(Continued)

*Primary Examiner* — Brent W Herring
(74) *Attorney, Agent, or Firm* — David A. Burge

(57) ABSTRACT

Component sets installed at selected intervals along the lengths of upwardly opening, just-below-floor-level utility trenches maintain a substantially parallel-extending relationship between opposed pairs of elongate, upstanding sheet metal panels that form opposite sidewalls of the utility trench passageways while concrete is being poured to form concrete floors in commercial and industrial facilities. The component sets include pairs of elongate, metal uprights having channel-shaped cross-sections, and elongate connecting members that bridge between the paired uprights. Pipes, tubes and conduits installed in the utility trenches, and cover plates that overlie and close the utility trenches, are supported by the connecting members.

27 Claims, 8 Drawing Sheets

(56) References Cited

U.S. PATENT DOCUMENTS

| | | | |
|---|---|---|---|
| 4,553,874 A | 11/1985 | Thomann et al. | 404/4 |
| 4,621,939 A | 11/1986 | Thomann et al. | 404/4 |
| 4,630,962 A | 12/1986 | Thomann et al. | 404/2 |
| 4,630,966 A | 12/1986 | Karbstein | 405/118 |
| 4,640,643 A | 2/1987 | Williams | 404/4 |
| 4,698,947 A * | 10/1987 | McKay | 52/309.12 |
| 4,699,544 A | 10/1987 | Karbstein | 405/118 |
| 4,706,429 A * | 11/1987 | Young | 52/309.12 |
| 4,815,888 A | 3/1989 | Stegmeier | 404/4 |
| 4,844,655 A | 7/1989 | Aleshire | 405/118 |
| 4,878,782 A | 11/1989 | Beattie et al. | 405/119 |
| 4,889,310 A * | 12/1989 | Boeshart | 249/41 |
| 4,940,359 A | 7/1990 | Van Duyn et al. | 405/118 |
| 4,993,878 A | 2/1991 | Beamer | 405/282 |
| 5,000,621 A | 3/1991 | Beamer | 405/282 |
| 5,026,202 A | 6/1991 | Thomann | 404/4 |
| 5,213,438 A | 5/1993 | Barenwald | 404/2 |
| 5,226,748 A | 7/1993 | Barenwald et al. | 405/121 |
| 5,256,000 A | 10/1993 | Beamer | 405/119 |
| 5,277,522 A | 1/1994 | Pertz | 405/283 |
| 5,281,052 A | 1/1994 | Beamer | 405/119 |
| 5,311,718 A * | 5/1994 | Trousilek | 52/425 |
| 2,701,027 A | 1/1995 | Scoville | 210/163 |
| 5,459,970 A * | 10/1995 | Kim | 52/424 |
| 5,475,950 A * | 12/1995 | Palmer | 52/169.5 |
| 5,529,436 A | 6/1996 | Meyers | 405/119 |
| 5,537,797 A * | 7/1996 | Harkenrider et al. | 52/745.13 |
| 5,538,361 A | 7/1996 | Beamer | 405/118 |
| 5,568,995 A | 10/1996 | Beamer | 405/119 |
| 5,645,367 A | 7/1997 | Gunter | 404/3 |
| 5,718,537 A | 2/1998 | Becker et al. | 405/119 |
| 5,810,513 A | 9/1998 | Beamer et al. | 405/119 |
| 5,896,714 A * | 4/1999 | Cymbala et al. | 52/426 |
| 5,971,662 A | 10/1999 | Becker et al. | 405/119 |
| 6,000,881 A | 12/1999 | Becker et al. | 405/119 |
| 6,027,283 A | 2/2000 | Schweinberg et al. | 405/42 |
| 6,113,311 A | 9/2000 | Becker et al. | 405/119 |
| 6,167,669 B1 * | 1/2001 | Lanc | 52/426 |
| 6,220,784 B1 | 4/2001 | Bricker | 405/118 |
| 6,595,720 B2 | 7/2003 | Humphries et al. | 405/118 |
| 7,048,466 B2 | 5/2006 | Benesteau et al. | 404/4 |
| 7,125,506 B2 | 10/2006 | Humphries et al. | 264/35 |
| 7,347,029 B2 * | 3/2008 | Wostal et al. | 52/426 |
| 7,413,372 B2 | 8/2008 | Meyers | 404/2 |
| 7,438,802 B2 | 10/2008 | Hurst | 210/163 |
| 7,444,788 B2 * | 11/2008 | Morin et al. | 52/425 |
| 7,534,071 B2 | 5/2009 | Humphries et al. | 405/118 |
| 7,637,695 B1 | 12/2009 | Akkala | 405/118 |
| 7,736,092 B2 | 6/2010 | Hodgekins et al. | 405/119 |
| 7,757,448 B2 * | 7/2010 | Zhu | 52/309.12 |
| 7,818,936 B2 * | 10/2010 | Morin et al. | 52/426 |
| 7,874,112 B2 * | 1/2011 | Kovatch et al. | 52/309.1 |
| 7,882,672 B2 * | 2/2011 | Emblin | 52/426 |
| 7,967,523 B2 | 6/2011 | Hetzler et al. | 404/4 |
| 7,975,436 B2 | 7/2011 | Newton | 52/20 |
| 2005/0025572 A1 | 2/2005 | Sanfilippo et al. | 405/36 |

OTHER PUBLICATIONS

Zurn Industries LLC Pittsburgh—Utility Trench Perma-Duct 1 Page—Dated May 2011.

* cited by examiner

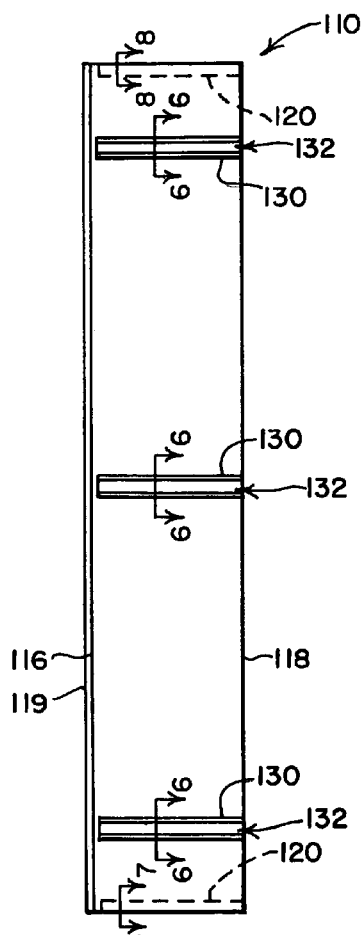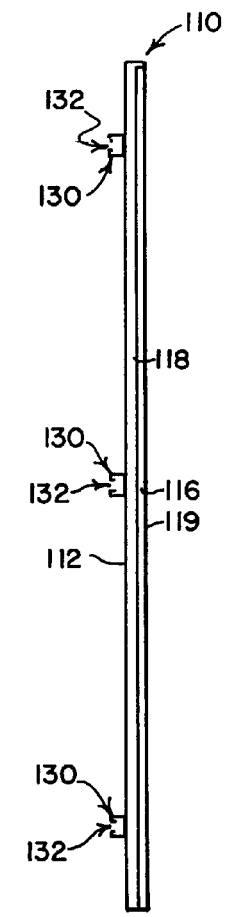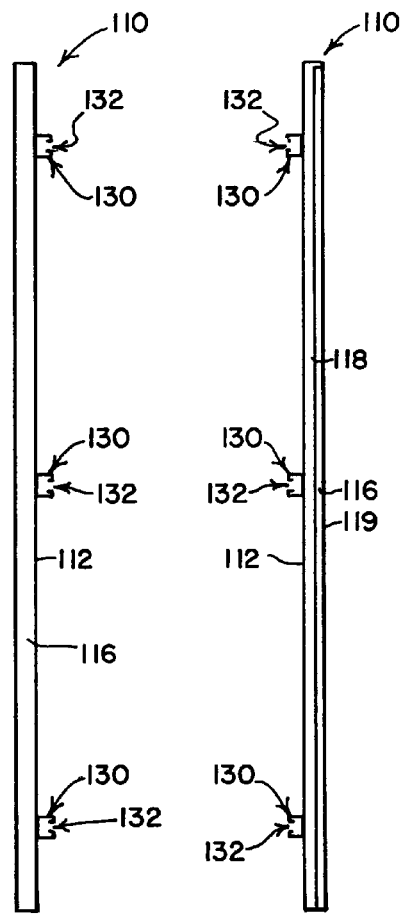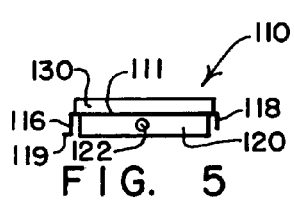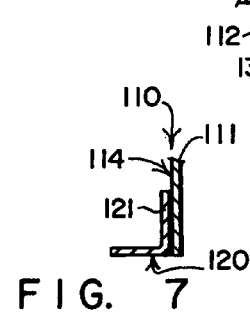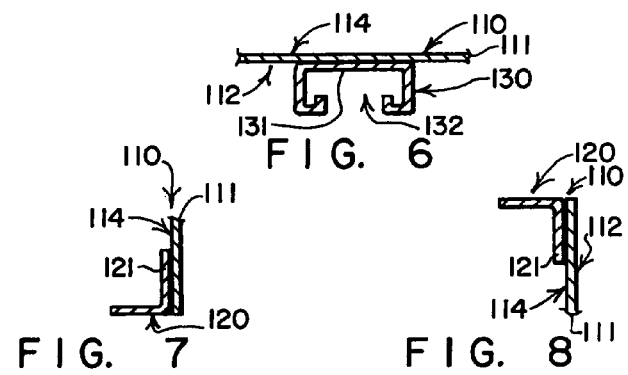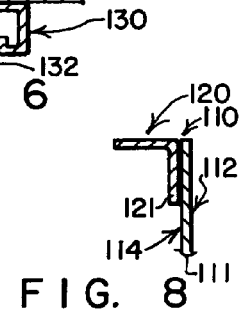

UTILITY TRENCH SYSTEM COMPONENTS

CROSS-REFERENCES

This application claims the benefit of the filing date of provisional application Ser. No. 61/634,468 filed Feb. 29, 2012 entitled UTILITY TRENCH STRUCTURAL COMPONENTS AND UTILIZATION METHODS.

This application is a continuation-in-part of each of the following five design applications:

1) Ser. No. 29/395,617 filed Feb. 29, 2012 entitled UTILITY TRENCH SIDE PANEL PORTION;
2) Ser. No. 29/442,276 filed Jan. 18, 2013 entitled PIPE TRENCH SIDE PANEL;
3) Ser. No. 29/442,273 filed Jan. 18, 2013 entitled PIPE TRENCH SIDE PANEL;
4) Ser. No. 29/442,274 filed Jan. 18, 2013 entitled PIPE TRENCH SIDE PANEL ELBOW; and
5) Ser. No. 29/442,275 filed Jan. 18, 2013 entitled PIPE TRENCH SIDE PANEL ELBOW.

The disclosures of the applications identified above are incorporated herein by reference.

BACKGROUND

The present invention relates to component sets that are installed at selected intervals along the lengths of the just-below-floor-level spaces, channels and passageways that are known in the art as "utility trenches," wherein lengthy reaches of tubular members such as pipes, tubes and conduits extend for ducting, carrying and supplying such necessities as compressed air, pressurized fluids, gases used for medical and manufacturing purposes, and exhaust gases, as well as vacuum, refrigeration and air conditioning lines, fiber optic cables, and electrical supply, signal, data and communication cables, and the like.

More particularly, the present invention relates to easily assembled sets of relatively inexpensive components that are well suited not only to aid in the form ation of utility trenches during the pouring of concrete floors that embed connected lengths of utility trench sections in the concrete floors at just-below-floor-level heights, but that also are well suited to underlie and support such pipes, tubes and conduits as are positioned in the utility trenches. Further, the component sets, when assembled and installed at selected intervals along the lengths of utility trenches, provide very versatile arrays of attachment points for conventional, commercially available pipe clamp brackets that give long-term support for such pipes, tubes and conduits as are installed in and may need to be added to utility trenches.

During the construction of commercial and industrial facilities, a common practice prior the pouring of concrete to form floors that are to include just-belowfloor-level utility trenches, is to properly position upstanding sheet metal panels that will become the sidewalls of utility trenches wherein pipes, tubes and conduits will extend from place to place for carrying fluids, wires, cables and the like. To hasten and simplify the positioning of utility trench side panels, prefabricated sections that have appropriately spaced-apart, parallel-extending, sheet metal side panels are arranged end-to-end, and are bolted together, with uppermost edges of the sheet metal side panels being supported to extend precisely at a level chosen for the top surface of a soon-to-be-poured concrete floor. Each of the prefabricated sections has component sets installed between its upstanding side panels to maintain a desired spacing between the side panels.

When concrete is poured to form the floor, the freshly poured concrete is fed along and against exterior surfaces of the sheet metal side panels. If the component sets installed between the side panels permit the side panels to shift or to bulge inwardly as concrete is poured along exterior surfaces of the side panels, the resulting utility trenches will be improperly formed, which can complicate and delay the eventual installation of pipes, tubes and conduits therein.

When the freshly poured concrete has set sufficiently to retain the upstanding sheet metal side panels securely in position, it is common practice to remove from within the newly-formed utility trenches some of the parts and pieces that defined the sets of components which were originally installed in the prefabricated sections. If all of these parts and pieces are left in place, they will obstruct and delay the installation of pipes, tubes and conduits in the utility trenches. However, such parts and pieces of the component sets as are permitted to remain in the utility trench sections are sometimes connected to when pipe clamp brackets and other structures are installed to position and support the lengthy reaches and runs of pipes, tubes and conduits that are eventually installed in the utility trenches.

Although components of a variety of types have been proposed for installation in prefabricated sections of utility trenches, such components as are known and proposed to date have frequently underperformed in maintaining substantially parallel-extending relationships between sheet metal side panels. Moreover, known and proposed components have tended to be unduly expensive, unduly complex to work with, and have almost universally lacked a much needed degree of versatility in permitting pipes, tubes and conduits of a wide range of types and sizes to be positioned and securely supported in utility trench passageways, and in permitting pipes, tubes and conduits to be added to existing utility trench installations.

One specific problem that has led to dissatisfaction with existing component sets installed in utility trenches has been the failure of connections that attach the ends of horizontal crossbars that underlie and support pipes, tubes and conduits to uprights. The massive weight that is often imposed on such crossbars by the weight of heavy pipes, tubes and conduits, and by the weight of the fluids or electrical supply cables and the like contained in the pipes, tubes and components is sometimes so significant that the connections attaching opposite ends of crossbars to supporting uprights are so strained as to permit slippage, resulting in unacceptable sagging of pipes, tubes and conduits that need to be supported at the carefully selected heights at which the crossbars were originally installed.

Another specific problem that has led to dissatisfaction with existing component sets has been the difficulties caused by such complex and unwieldy connections as have been used to attach the ends of such horizontal-extending crossbars as may underlie and support the cover plates of utility trenches to opposed sidewalls of the trenches. Because the crossbars that underlie and support cover plates often must be removed and eventually reinstalled each time that a pipe, tube or conduit needs to be added to an existing utility trench, the connections that support opposite ends of such crossbars need to permit easy release and reinstallation of the crossbars.

Still another problem that plagues existing sets of support components installed at intervals along utility trenches is their failure of versatility in providing for new lengths of pipes, tubes and conduits to be added to existing utility trenches. In factories and manufacturing facilities, it sometimes seems as though a new length of electrical conduit or a new water line needs to be added to an existing utility trench almost as soon as the trench has been closed after installing the last addition thereto of a new electrical conduit or water line. Considerable delays and added expense are incurred when it is observed that a utility trench has adequate room to accommodate a needed addition, but the existing support components in the utility trench cannot accommodate the needed addition—thus new support components must be engineered and installed before a new pipe, tube or conduit can be added to the existing utility trench.

In short, a long-standing need has existed for a highly versatile set of easy-to-assemble, relatively inexpensive and truly versatile components that are not only well-suited to be positioned at spaced intervals along the lengths of utility trenches for maintaining substantially parallel-extending relationships between the upstanding sheet metal side panels during the pouring of a concrete floors that embed utility trench sections, but also for providing structures that are well-suited to underlie and support lengthy runs of the pipes, tubes and conduits that are installed in newly formed utility trenches, and that may need to be added to existing utility trenches.

SUMMARY

The present invention addresses the foregoing and other needs and deficiencies of the prior art by providing easily assembled sets of simple, relatively low cost components that are useful not only in the formation of just-below-floor-level utility trenches, but also in positioning and supporting pipes, tubes and conduits of a wide variety of sizes in the spaces, channels and passageways that are defined by utility trenches. In preferred practice, the component sets also serve to underlie, support, and provide versatile points of attachment for the below-floor-level pipes, tubes and conduits, and for such at-floor-level cover plates as are selected to overlie and releasably close the upwardly opening utility trenches.

The component sets that embody features of the present invention are intended for installation at spaced intervals along and between pairs of sheet metal panels that define opposite, upstanding sides of utility trench reaches. Each component set includes a pair of uprights, and at least one connecting member configured to bridge transversely between and to securely connect the opposed pair of uprights.

The uprights extend substantially vertically, with each of a pair of uprights being connected to an interior surface of a separate one of the upstanding side panels of an associated utility trench section. The connecting members extend substantially horizontally, with each having opposite end regions that connect with a separate one of a pair of opposed uprights.

In one preferred manifestation or embodiment, component sets which are installed at spaced locations along the length of a utility trench or utility trench section each include a pair of substantially identical metal uprights of channel-shaped cross-section; and at least one transversely extending connecting member that has substantially identical end regions configured to be inserted into interior portions of a separate one of the pair of uprights to maintain a substantially parallel-extending relationship between the uprights and the sheet metal side panels connected thereto during pouring of concrete along exterior surfaces of the side panels.

In one preferred manifestation or embodiment, metal uprights of channel-shaped cross-section are securely connected to upstanding sheet metal side panels at selected intervals therealong, and are arranged in pairs with the uprights of each pair opening toward each other. At least one elongate connection member bridges between and connects each paired set of the uprights. End regions of the connecting members are configured to either securely grip the uprights that the connecting members bridge between, or to be snugly received within the interiors of the uprights that the connecting members bridge between, or both.

Because the metal uprights are either securely gripped by end regions of the connecting members, or are configured to snugly interiorly receive end regions of the connecting members, the connecting members are well suited to assist in maintaining the metal uprights and the sheet metal side panels connected thereto in substantially parallel-extending relationship 1) while concrete is being poured along exterior surfaces of the sheet metal side panels, and 2) until the freshly poured concrete sets or hardens sufficiently to hold the side panels in place.

In one preferred manifestation or embodiment, at least one of the connecting members is formed from wood or a wood substitute. In another preferred manifestation or embodiment, the connecting members are all formed from metal and have elongate central regions of channel-shaped cross-section, with opposite end regions configured to depend into and to be received snugly within the interiors of an associated pair of metal uprights that the connecting member bridges between.

Because both the uprights and connecting members that bridge between pairs of the uprights preferably have channel-shaped cross-sections to which conventional, commercially available pipe clamps and brackets are easily connected, the pipes, tubes and conduits that are installed in utility trenches may be connected to and supported by any of the components which have channel-shaped cross-sections. Moreover, because the uprights and the connecting members that bridge therebetween have channel-shaped cross-sections that open toward a common space in an upper part of their associated utility trench, pipes, tubes and conduits can often be added with relative ease to the upper regions of existing utility trenches, without having to engineer and install additional support components.

Still further, because the component sets that are utilized in accordance with preferred practices of the present invention not only utilize upper connecting members to which cover plates are releasably attached, but which also have end regions that attach to upper end regions of the uprights of a utility trench through the use of push-together/pull-apart connections, the removal and reinstallation of the cover plates and their underlying connecting members can be easily accomplished with a minimum of down-time when existing utility trenches must be opened and subsequently reclosed to accommodate the addition of a new pipe, tube or conduit.

DESCRIPTION OF THE DRAWINGS

A fuller understanding of the present invention may be had by referring to the description and claims that follow, taken in conjunction with the accompanying drawings, wherein:

FIG. 2 is a side view of one of the identical side panels;

FIG. 3 is a top view thereof;

FIG. 4 is a bottom view thereof;

FIG. 5 is a left end view thereof, it being understood that a right end view is a mirror image thereof;

FIG. 6 is an enlarged cross-sectional view as seen from any of several planes indicated by lines 6-6 in FIG. 2;

FIG. 7 is an enlarged cross-sectional view as seen from a plane indicated by a line 7-7 in FIG. 2;

FIG. 8 is an enlarged cross-sectional view as seen from a plane indicated by a line 8-8 in FIG. 2;

DETAILED DESCRIPTION

Figure 1:
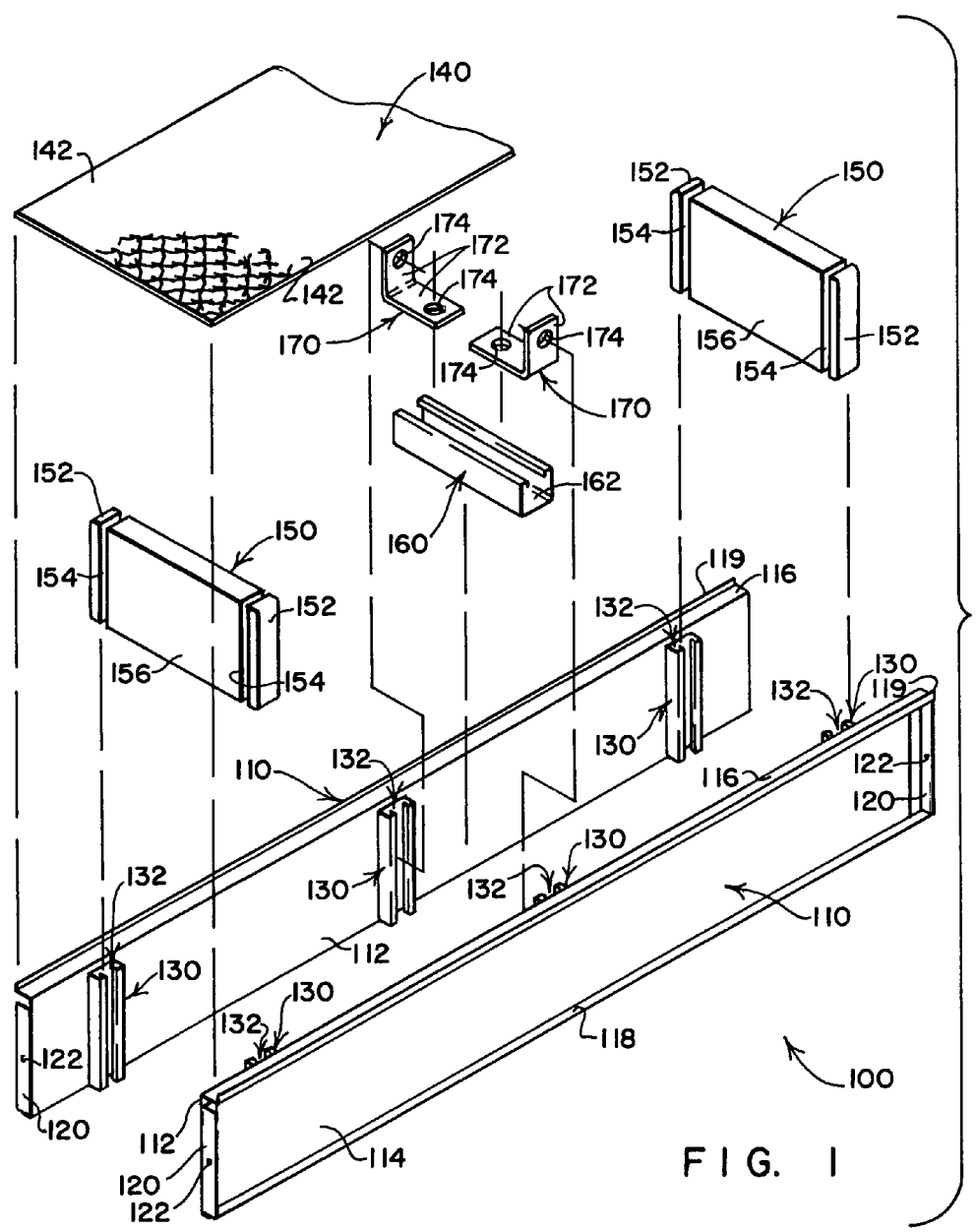
FIG. 1 is an exploded perspective view showing elements that may be used to form an elongate, prefabricated section of a utility trench, with the view including two identical, generally rectangular sheet metal side panels that are held in parallel-extending relationship by others of the depicted elements that are utilized to extend or bridge between metal uprights of channel-shaped cross-section that are welded in opposed pairs to the upstanding side panels.
Figure 9:
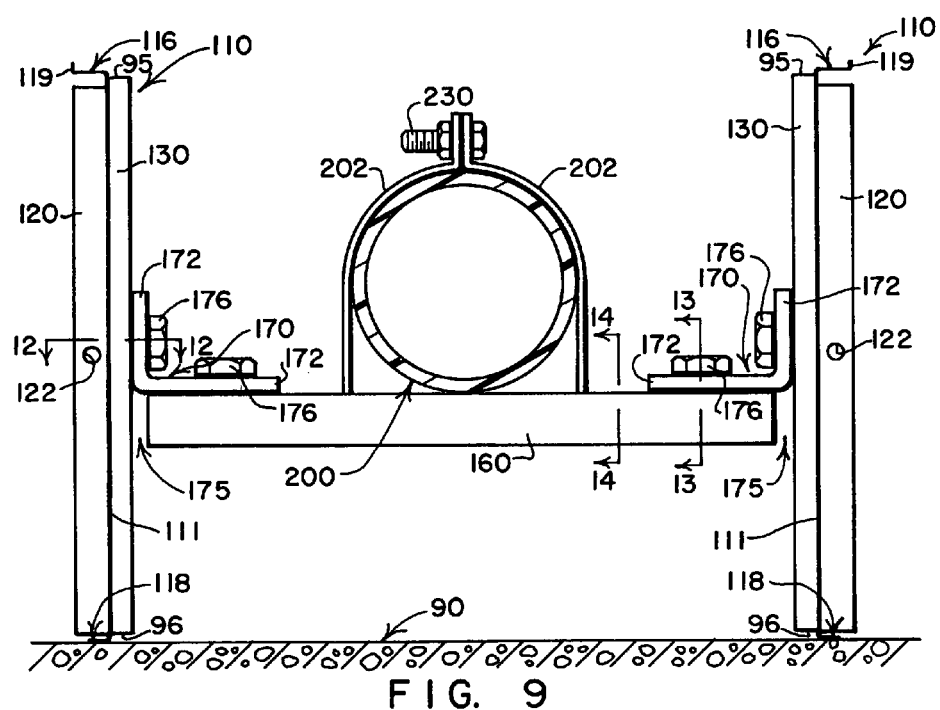
FIG. 9 is a sectional view showing a connecting member installed between a pair of uprights and underlying a plurality of pipes that are shown in cross-section, and that are attached to the connecting member by conventional, commercially available pipe clamp brackets.
Figure 10:
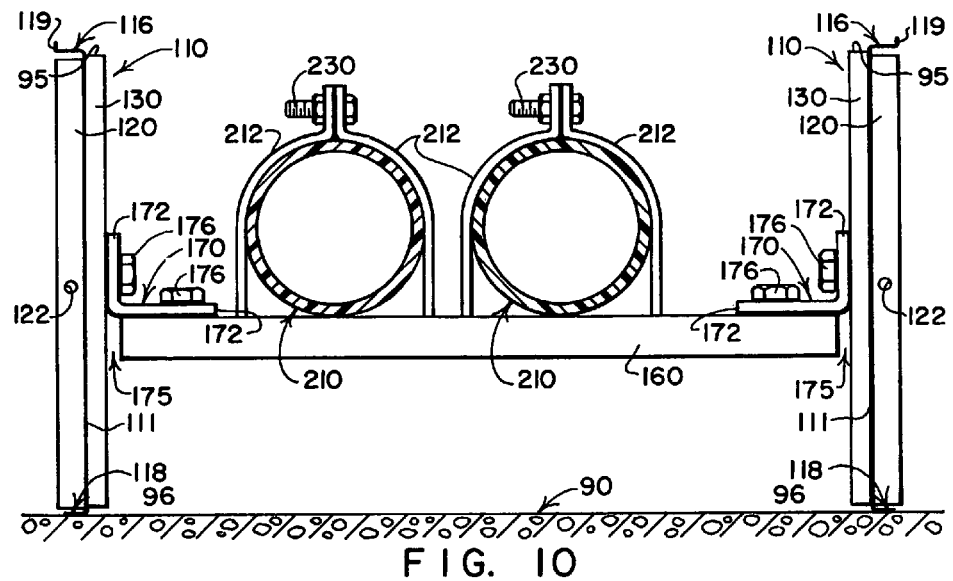
FIG. 10 is a sectional view showing a connecting member installed between a pair of uprights and underlying a plurality of pipes that are shown in cross-section, and that are attached to the connecting member by conventional, commercially available pipe clamp brackets.
Figure 11:
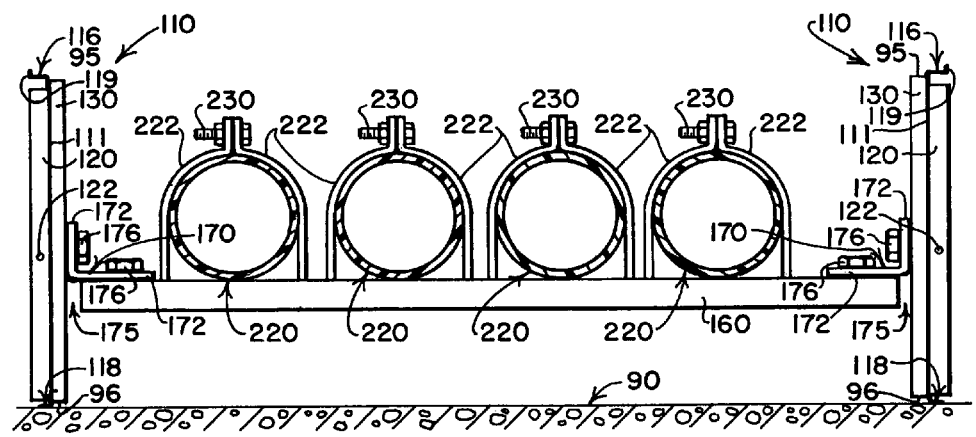
FIG. 11 is a sectional view showing a connecting member installed between a pair of uprights and underlying a plurality of pipes that are shown in cross-section, and that are attached to the connecting member by conventional, commercially available pipe clamp brackets.

Referring to FIG. 1, a set of components 100 is shown that can be used to form an elongate section of a so-called "utility trench." Components configured as depicted separately and in various states of assembly in FIGS. 1-17 may be utilized to support pipes, tubes and conduits 200, 210, 220 in utility trenches in a manner such as is shown in FIGS. 9, 10 and 11, respectively. FIGS. 18-22 depict alternate ways in which selected ones of the components depicted in FIGS. 1-17 may be combined with additional components and with substitute components, for being positioned at predetermined intervals along the interiors of utility trench side panels 110 to support the pipes, tubes and conduits 200, 210, 220.

When components of the type indicated generally by the numeral 100 are assembled to form an elongate section of a utility trench, the resulting section may be positioned end-to-end with similar other assembled utility trench sections. Adjacent section end regions may then be bolted together or otherwise securely joined to define a utility trench that extends from one desired location to another, or among a plurality of desired locations.

As those skilled in the art will readily understand, uppermost edges of the upstanding side panels 110 typically are carefully positioned and supported to extend at the desired level of a top surface of a concrete floor. Concrete may then be poured along and extending away from the exteriors of the upstanding side panels 110 to create a newly poured floor, and to thereby embed in the newly poured concrete floor one or more utility trenches which are defined between the upstanding spaced side panels 110 at just-below-floor-level heights.

The identical, upstanding, sheet metal side panels 110 are generally rectangular, and may take any of a wide range of selected lengths and heights. Alternatively, selected components from the depicted set 100 may be used together with upstanding side panels such as are disclosed in the above-referenced design applications to provide utility trench sections (not shown) that include elbows, tees and cross-shaped junctures, as may be needed to permit lengthy reaches of such pipes, tubes and conduits as may be installed in utility trenches to extend among a variety of desired locations, as those skilled in the art will readily understand.

Returning to FIG. 1, in addition to the identical sheet metal side panels 110, the component set 100 includes a plurality of elongate, upstanding, metal angle irons 120, a plurality of elongate, upstanding, metal uprights 130 that are of uniform, channel-shaped cross-section along their lengths, a generally rectangular cover plate 140, a plurality of elongate, generally rectangular, transversely-extending connecting members 150, one or more elongate metal connecting members 160, and a plurality of generally L-shaped attachment brackets 170.

When a set of components of the type indicated by the numeral 100 in FIG. 1 are assembled to provide an elongate utility trench section, externally threaded fasteners (typically hex-headed cap screws 176 such as are shown in FIGS. 9-13 and 16) and internally threaded fasteners (typically hex nuts or nut-like retainers 180 such as are shown in FIGS. 12, 13, 16 and 17) are used in combination with the L-shaped attachment brackets 170 to bridge between and couple the channel-shaped connecting members 160 to the channel-shaped uprights 130 in the manner shown in FIGS. 9-11. By this arrangement, pipes, tubes and conduits 200, 210, 220 such as are shown in cross-section in FIGS. 9, 10 and 11, respectively, can be positioned and securely supported atop the channel-shaped connecting members 160 through the use of conven-conventional, commercially available pipe clamp brackets 202, 212, 222 such as are shown in FIGS. 9, 10 and 11, respectively.

Flat plates (not shown) are preferably bolted or otherwise securely attached to the angle irons 120 that are adjacent any open ends of a newly constructed utility trench, to close the open ends of the trench.

When concrete is being poured to form a concrete floor (not shown) having a walk-on or drive-on top surface at a level to which uppermost edges of the opposed sheet metal side panels 110 extend, a plurality of the rectangular connecting members 150 shown in FIG. 1 may be installed to bridge transversely between opposed pairs of the uprights 130 to ensure that a substantially parallel-extending relationship is maintained by the upstanding sheet metal side panels 110, and to ensure that the sheet metal side panels 110 do not bulge inwardly under the influence of such force as may be exerted on the sheet metal side panels 100 when concrete is poured along exterior surfaces thereof.

Figure 15:
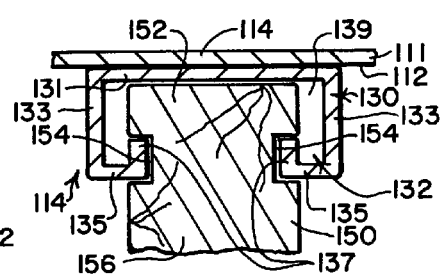
FIG. 15 is an enlarged cross-sectional view showing how one of two identical end regions of a connecting member is received in the interior of one of the uprights.
Figure 16:
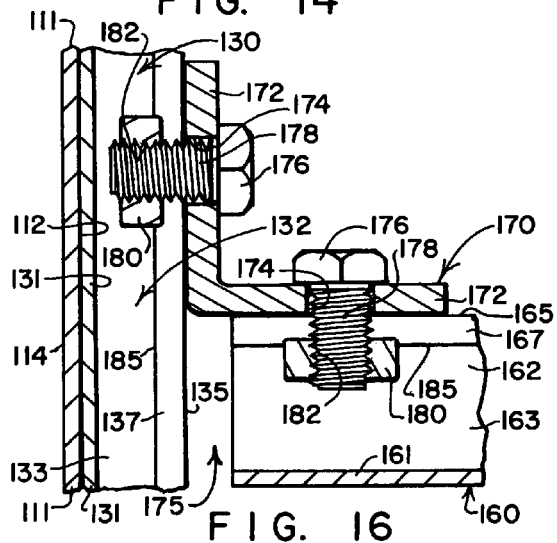
FIG. 16 is an enlarged cross-sectional view showing a bolted connection of one of connecting members to one of the uprights.

When installed between opposed pairs of the uprights 130, opposite end regions 152 of the of the connecting members 150 extend into the interiors 132 of the uprights 130, as is shown in FIG. 15. Once the newly poured concrete has set or hardened sufficiently to assist in maintaining the parallel-extending relationship of the upstanding side panels 110, the transversely extending connecting members 150 may be removed and reused in the formation of other utility trench lengths.

A plurality of the identical, elongate, metal connecting members 160 (which have substantially uniform channel-shaped cross-sections along their lengths) may be installed to bridge transversely between the uprights 130 at a time after the generally rectangular connecting members 150 are removed. Alternatively, a plurality of the elongate metal connecting members 160 may be installed to bridge between the uprights 130 to serve in place of the connecting member 150, may be installed at levels below or above the connecting members 150 to cooperate with and assist the connecting members 150 to maintain the substantially parallel-extending relationship of the upstanding side panels 110 as concrete is poured along exterior surfaces 114 of the side panels 110.

Eventually, only such elongate metal connecting members 160 as are needed to support the pipes, tubes and conduits 200, 210, 220 (such as are shown in FIGS. 9, 10 and 11, respectively) may be retained and positioned to bridge between the uprights 130 at appropriate heights for underlying and supporting pipes, tubes and conduits 200, 210, 220 as shown in FIGS. 9, 10 and 11, respectively.

The sheet metal side panels 110 that form opposite upstanding sides of any particular one of the preformed utility trench sections are of identical length and height. A variety of side panel lengths may be manufactured so that, when various sections are assembled end-toend and bolted together (or otherwise securely connected) to define a utility trench, the resulting utility trench can be of substantially any desired length. A variety of side panel heights also may be manufactured because some utility trench installations need to extend farther beneath floor level that others, especially if two or more sets of the connecting members 160 are to extend between each paired set of the uprights 130 to position pipes, tubes and conduits at two or more distinct levels in an unusually deep utility trench (not shown). And, by using upstanding side panels such as are disclosed in the five referenced design applications, the resulting utility trenches can include junctures and branches formed through the use of elbow, tee and cross-shaped junctures.

FIGS. 2-4 depict a typical one of the sheet metal side panels 110. The side panels 110 preferably have left and right halves that are symmetrically configured so as to provide mirror images of each other. Interior surfaces of the side panels 110 are indicated by the numerals 112. Exterior surfaces of the side panels 110 are indicated by the numerals 114.

In preferred practice, each side panel 110 actually constitutes a welded assembly 1) that has identical ones of the angle irons 120 welded to its opposite end regions, and 2) that has a plurality of the uprights 130 of channel-shaped cross-section welded to the side panel's interior surface 112 at spaced intervals along the length thereof. The uprights 130 are arranged in opposed pairs such that, opposite each upright 130 that is welded to the interior surface 112 of one of the two identical side panels 110 is an identical, paired upright 130 that is welded to the interior surface 112 of the opposite side panel 110. Paired sets of the channel-shaped uprights 130 have interiors 132 that open toward each other.

While the upstanding angle irons 120 that are welded to opposite end regions of the side panels 110 are shown in the drawings as providing only one bolt hole 122 to be used by cap screws or other appropriate threaded fasteners (not shown) to connect adjacent utility trench sections arranged end-to-end, it will be understood that the angle irons 120 may be provided with a plurality of the bolt holes 122 to receive a plurality of threaded fasteners. Alternatively, the angle irons 120 may be provided with no bolt holes 122 because none are needed if adjacent utility trench sections are to be welded together as they are positioned and installed end-to-end. In some installations, the sheet metal side panels 110 may simply be provided with outwardly turned flanges (not shown) that are used in place of the angle irons 120, and that are bolted or welded together end-to-end to provide a utility trench of suitable length.

In FIGS. 6-8, portions of one of the sheet metal side panels 110 are indicated by the numeral 111. How a typical one of the uprights 130 has a substantially flat back wall 131 that extends along the interior surface 112 of the side panel portion 111 so a welded connection can be formed therebetween is shown in FIGS. 6, 12, 15 and 16. How the angle irons 120 have substantially flat portions 121 that extend along the exterior surface 114 of the side panel portion 111 so a welded connection can be formed therebetween is shown in FIGS. 7 and 8.

In FIG. 5, it can be seen that one of the uprights 130 is connected to an opposite side (namely the interior side 112) of the side panel 111 from one of the angle irons 120 (which is connected to the exterior side 114 of the side panel 111, as is explained just above). Also shown in FIG. 5 is the fact that the side panel 110 has an outwardly turned top formation 116 that extends along substantially the full length of the side panel 110, and a similar outwardly turned bottom flange 118 that also extends along substantially the full length of the side panel 110.

The top formation 116 differs from the bottom flange 118 in that the top formation 116 not only includes the outwardly extending portion that substantially parallels the bottom flange 118, but also is provided with a short, upwardly turned portion 119 that extends along substantially the full length of the side panel 110. The upwardly turned portion 119 is intended to have a height dimension that is substantially equal to the thickness of the cover plate 140 shown in FIG. 1.

Figure 19:
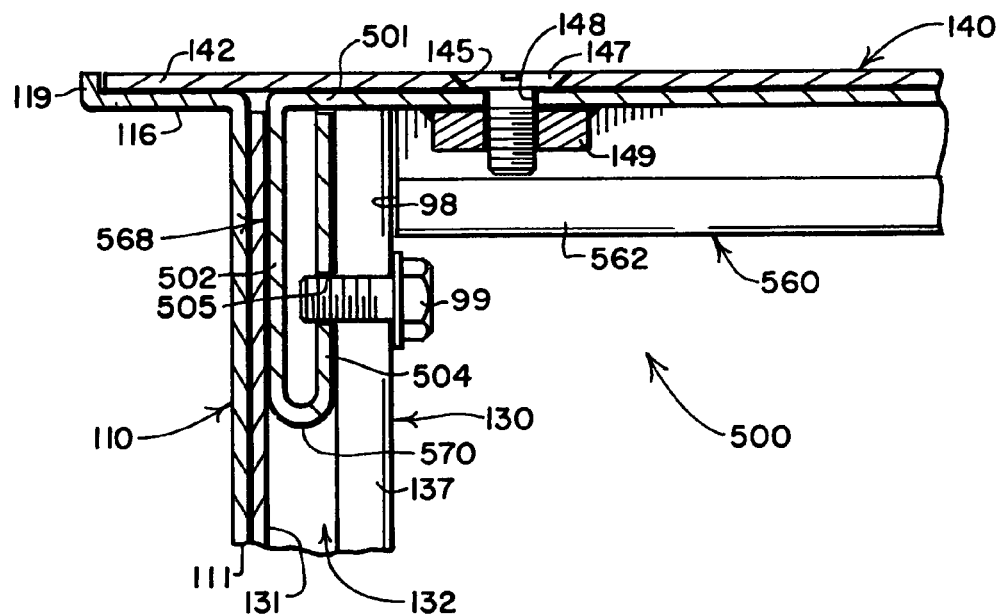
FIG. 19 is a sectional view showing how selected elements of a component set embodying features of the present invention may be assembled.

As can be seen in FIG. 19, when the cover plate 140 is positioned to overlie and close the upwardly opening top of a utility trench, the cover plate 140 has opposed edge regions 142 (also labeled in FIG. 1) that are intended to rest atop the outwardly extending top formations 116 of the side panels 110. If desired, the top plate 140 may also be provided with holes (one of which is indicated by the numeral 145 in FIG. 19) through which threaded fasteners may extend (one of which is indicated by the numeral 147 in FIG. 19) which may be threaded into whatever structure provided with a threaded opening as may underlie the cover plate 140 (for example one of the outwardly extending formations 116 can be provided with threaded holes, not shown).

As can be seen in FIGS. 9-11, top and bottom end regions 95, 96, respectively, of the uprights 130 extend upwardly (not quite as far as the location of the outwardly turned top formation 116) and downwardly (not quite as far as the location of the outwardly turned bottom flange 118), respectively. The short height difference (between the top end region 95 and the top formation 116) substantially equals the thickness of the metal material that forms a connecting member 560 shown in FIG. 19. By this arrangement, when an end portion that is indicated by a numeral 501 overlies a part of the upper end 95 of one of the uprights 130, the connecting member 560 is caused to extend at the same horizontal level as the upper surface of an adjacent top formation 116 to cooperate with the top formation 116 in underlying, engaging and supporting the overlying cover plate 140.

What is intended herein by the term "channel-shaped cross-section" is preferably a generally C-shaped cross-section that has details such as are described in the next two paragraphs in conjunction with the channel-shaped cross-sections of the uprights 130 and the connecting members 160.

Details that define the channel-shaped cross-section (or C-shaped cross-section, as it is sometimes called) of each of the identical uprights 130, are shown in FIGS. 6, 12, 15, 18, 20 and 21. In addition to the flat back wall 131 (that extends along and is securely connected, preferably by welding, to the internal surface 112 of an adjacent one of the side panels 110), the identical uprights 130 each have several integral formations including a pair of parallel walls 133 that extend perpendicularily away from the flat back wall 131, a pair of short front wall segments 135 that extend in a common plane which parallels the flat back wall 131, and a pair of inturned wall segments 137. The walls 131, 133 and 135 extend about perimeter portions of the interior 132 of each of the uprights 130. The walls 137 are spaced from each other, and define an opening therebetween that causes the interior 132 of paired ones of the uprights 130 to open toward each other.

Figure 13:
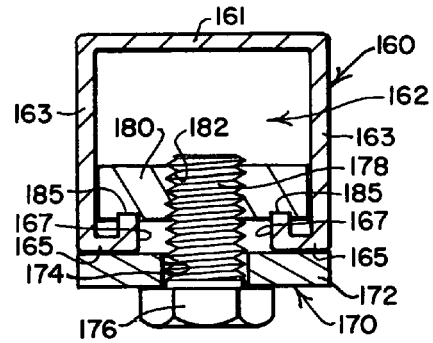
FIG. 13 is an enlarged cross-sectional view as seen from a plane indicated by a line 13-13 in FIG. 9.
Figure 14:
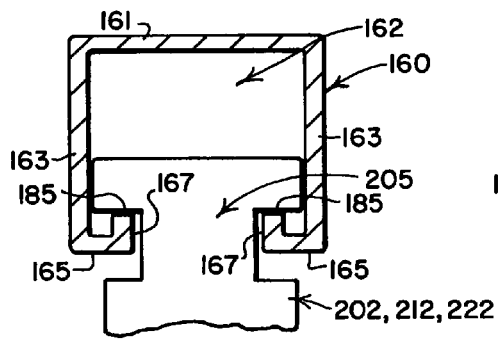
FIG. 14 is an enlarged cross-sectional view as seen from a plane indicated by a line 14-14 in FIG. 9.

Details that define the channel-shaped cross-section (or C-shaped cross-section, as it is sometimes called) of each of the identical, one-piece, connecting members 160 are shown in FIGS. 13 and 14. In addition to having a flat back wall 161, the connecting members 160 each have a pair of walls 163 that extend perpendicularly away from the back wall 161, a pair of walls 165 extending in a common plane that parallels the back wall 161, and a pair of inwardly turned walls 167. Just as the uprights 130 have interiors 132 that open between the walls 137 toward the interior of the adjacent utility trench, the connecting members 160 have interiors 162 that open between the walls 167 in an upward direction toward the cover plate 140.

Figure 12:
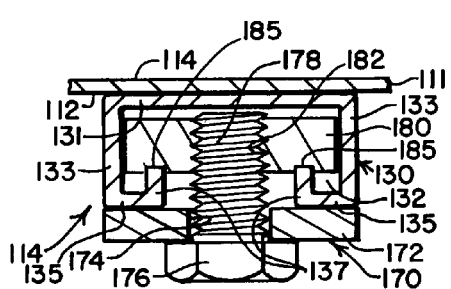
FIG. 12 is an enlarged cross-sectional view as seen from a plane indicated by a line 12-12 in FIG. 9.

FIGS. 12 and 13 show how the L-shaped attachment brackets 170 are used together with the cap screws 176 and the nut-like members 180 to fasten the connecting members 160 to the uprights 130. FIG. 14 shows how the conventional pipe clamp brackets 202, 212, 222 have T-shaped end regions 205 that extend into the interiors 162 of the connecting members 160 to connect the pipe clamp brackets 202, 212, 222 to the connecting members 160 to secure the pipes, tubes and conduits 200, 210, 220 atop the connecting members 160 in the manner shown in FIGS. 9, 10 and 11, respectively. FIGS. 9, 10 and 11 also depict how cap screws 230 are used to couple pairs of the conventional pipe clamp brackets 202, 212, 222, respectively.

The number of uprights 130 that are connected to a particular side panel 110, and the spacing between adjacent ones of the uprights 130 may differ depending on a number of factors such as the length of the side panel 110 to which the uprights 130 are attached, and the weight of pipes, tubes and conduits 200, 210, 220 (FIGS. 9, 10 and 11, respectively) that connecting members 160 must carry. Also to be taken properly into account is the weight of such contents as are to be carried by the pipes, tubes and conduits 200, 210, 220.

Usually, the spacing between adjacent uprights 130 is within the range of about twenty to about forty inches. A spacing within the range of about twenty-four to about thirty inches is frequently selected. In preferred practice, one of the uprights 130 is usually positioned within about six to about twelve inches of each of the ends of each of the side panels 110.

Although the set of components 100 depicted in FIG. 1 is shown as including only one of the metal connecting members 160, those skilled in the art will appreciate that such arrays of pipes, tubes and conduits 200, 210, 220 as may be supported by the connecting members 160 are likely to be heavy, with their weight increased by the contents they carry. Accordingly, the set of components 100 depicted in FIG. 1 will typically require a plurality of the connecting members 160; each of the connecting members 160 will need to be capable of carrying a sizable load; and opposite end regions of the connecting members 160 will need to be securely connected to the uprights 130 to provide proper support for such pipes, tubes and conduits 200, 210, 220 (FIGS. 9, 10, 11) as may be positioned atop the connecting members 160. Moreover, the connecting members 160 and the pairs of uprights 130 provided in a length of utility trench may need to be relatively closely spaced to carry the weight of the array of pipes, tubes and conduits that are positioned in some utility trench installations.

In preferred practice, each of the connecting members 160 may have a length that is equal to, or slightly less than, the width of the space that extends between each of the pairs of uprights 130. However, the use of a connecting member length that is slightly less than the intended width of the space between the pairs of uprights 130 so as to leave a space 175 (FIGS. 9-11 and 16) between each connecting member's end region and the upright 130 to which the connecting member's end region connects, as shown in FIGS. 9-11 and 16) is preferred, to ensure that the connecting members 160 will always fit between each pair of the uprights 130, even in the event that one or more of the side panels 110 should bow slightly inwardly due to the force of concrete being poured adjacent the exterior surfaces 114 of the side panels 110.

The cover plate 140 may take any of a wide variety of forms, but is preferably formed from relatively heavy metal plate stock that may be stamped with a diamond shaped or other conventional pattern to enhance its rigidity and strength, and to provide an upwardly facing walk-on or drive-on surface that is skid resistant. Insulated cover plates (not shown) and cover plates of a wide variety of other conventional types may also be used in place of the depicted, relatively thin cover plate 140.

While the cover plate 140 is shown as having no openings or handles or other formations to facilitate its being grasped and lifted to open a utility trench covered and closed by the cover plate 140, such amenities (not shown) may be provided, if desired, when the cover plate 140 is formed. When positioned to serve as a closure that covers a length of utility trench, the cover plate 140 is positioned with opposed edge regions 142 of the cover plate resting atop the horizontally-extending top portions 116 of the upstanding side panels 110.

The elongate, generally rectangular connecting members 150 are all substantially identical. Circumferentially extending grooves 154 join the end regions 152 with a central region 156 of the connecting member 150. The identical end regions 152 are configured to be received with ease in the interiors 132 of the uprights 130. The grooves 154 are sized to permit the spaced, parallel-extending walls 137 of the uprights 130 to be received therein with very little looseness or play—which is to say that the end regions 152 of the connecting members 150 are intended to snugly connect with the uprights 130 so the connecting members 150 can serve to retain the substantially parallel-extending relationship of the uprights 130 (and of the side panels 110 that are welded to the uprights 130).

When paired sets of the uprights 130 receive opposite end regions 152 of one of the connecting members 150, the connecting members 150 are caused to extend at substantially right angles relative to the side panels 110, and are thereby caused to hold the side panels 110 in substantially parallel-extending relationship. Utilizing the connecting members 150 to hold the upstanding side, panels 110 in spaced, parallel extending relationship is helpful when concrete is being poured along the exterior surfaces 114 of the side plates 110.

Figure 17:
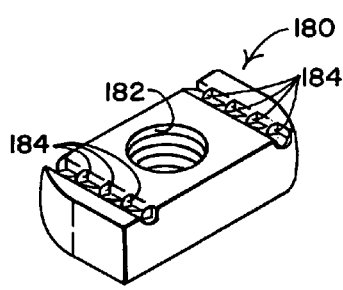
FIG. 17 is a perspective view showing a nut-like connection element into which a threaded fastener such as a cap screw can be threaded.

Referring to FIG. 17, the generally rectangular connection elements or retainers 180 are hardened metal members that not only serve as internally threaded "nuts" that receive in their internally threaded holes 182 the threaded stems 178 of the cap screws 176, but also are provided with two tracks of raised, hardened, V-shaped ridges or teeth 184 that are stamped along opposite sides of their internally threaded holes 182. When the cap screws 176 are tightened into the nut-like connection elements or retainers 180, the raised tracks of V-shaped ridges or teeth 184 are caused to bite into inwardly turned edge portions 185 (FIGS. 12, 13 and 16) of the uprights 130 and of the connecting members 160 which are engaged by the cap screws 176 and the nut-like retainers or connection elements 180, to ensure that the elongate connecting memers 160 are provided with slip-resistant attachments to the uprights 130 so that the weight of such pipes, tubes and conduits 200, 210, 220 (and the weight of the contents thereof) will be properly transferred from the elongate connecting members 160 to the uprights 130.

Indeed, a feature of preferred practice of the present invention lies in the use of the nut-like threaded connection elements or retainers 180 that have hardened toothed formations 184 which bite securely into the metal of uprights 130 at the locations where slip resistant connections are most urgently needed between the uprights 130 and opposite end regions of the horizontally-extending connecting members 160 that underlie and support pipes, tubes and conduits 200, 210, 220 such as are shown in FIGS. 9, 10 and 11, respectively.

To further ensure that the cap screws 176 do not loosen and thereby permit the attachments between the connecting members 160 and the uprights 130 to slip, the cap screws 176 may also be provided with conventional lockwashers (not shown) or conventional locknuts (not shown). Further, the mating threads of the cap screws 176 and the retainers 180 may be provided with a tight or an interference fit. The cap screws 176 are also preferably rated to carry high strength loads so the cap screws do not stretch or break when tasked in shear and tension to withstand the heavy loadings imposed thereon by the weight of some pipes, tubes and conduits, and the fluids, cables and the like that may be carried therein.

In accordance with the preferred method, after a utility trench has been formed with concrete being poured and allowed to set adjacent the exterior surfaces 114 of the plate members 110, the connecting members 160 are then installed at heights appropriate to support such pipes, tubes and conduits 200, 210, 220 as may be positioned atop the connecting members 160, as shown in FIGS. 9, 10 and 11. Conventional pipe clamp elements 202, 212 and 222 are then used to secure the pipes, tubes and conduits 200, 210 and 220, respectively, to the connecting members 160.

In preferred practice, the metal components described above are formed from galvanized steel to resist corrosion. In particularly corrosive environments, or in medical installations and the like, stainless steel may be used in place of galvanized steel. However, the connecting members 150 are preferably formed from wood, treated lumber, or other suitable fibrous, synthetic or woodsubstitute material that can be repeatedly reused as new utility trench lengths are formed.

Referring to FIGS. 9-11, one preferred manner of utilizing the components 100 is to provide a separate concrete floor 90 (specifically for the utility trench itself) which can be poured and permitted to set before the elongate, pre-fabricated utility trench sections having spaced apart side panels 110 are put in position atop the utility trench floor 90. In another method that makes use of features of the present invention, properly spaced pairs of the side panels 110 may be positioned with either or both of the connecting members 150 or 160 holding the side panels 110 in proper position, and a concrete floor 90 for the utility trench may then be poured between the side panels 110 and allowed to set or harden before the pipes, tubes and conduits 200, 210, 220 (FIGS. 9-11) are positioned and clamped in place atop the connecting members 160.

In a preferred form of the invention, elongate connecting members 150, 160 in a plurality of set lengths that may differ, for example by about six inches, are made available so that they can position the side panels 110 spaced-apart by set distances such as twelve, eighteen and twenty-four inches to provide utility trenches of different substantially "standard" widths, as may be needed to accommodate the requirements of various installations.

Because it may be deemed undesirable to make use of the wooden or fibrous connecting members 150 described above and shown in FIGS. 1 and 15, FIG. 18 shows an alternative set of all-metal components 500 that can be utilized between such upstanding sheet metal side panels 110 as have already been described and are shown in FIGS. 1-4 and 9-11.

Figure 18:
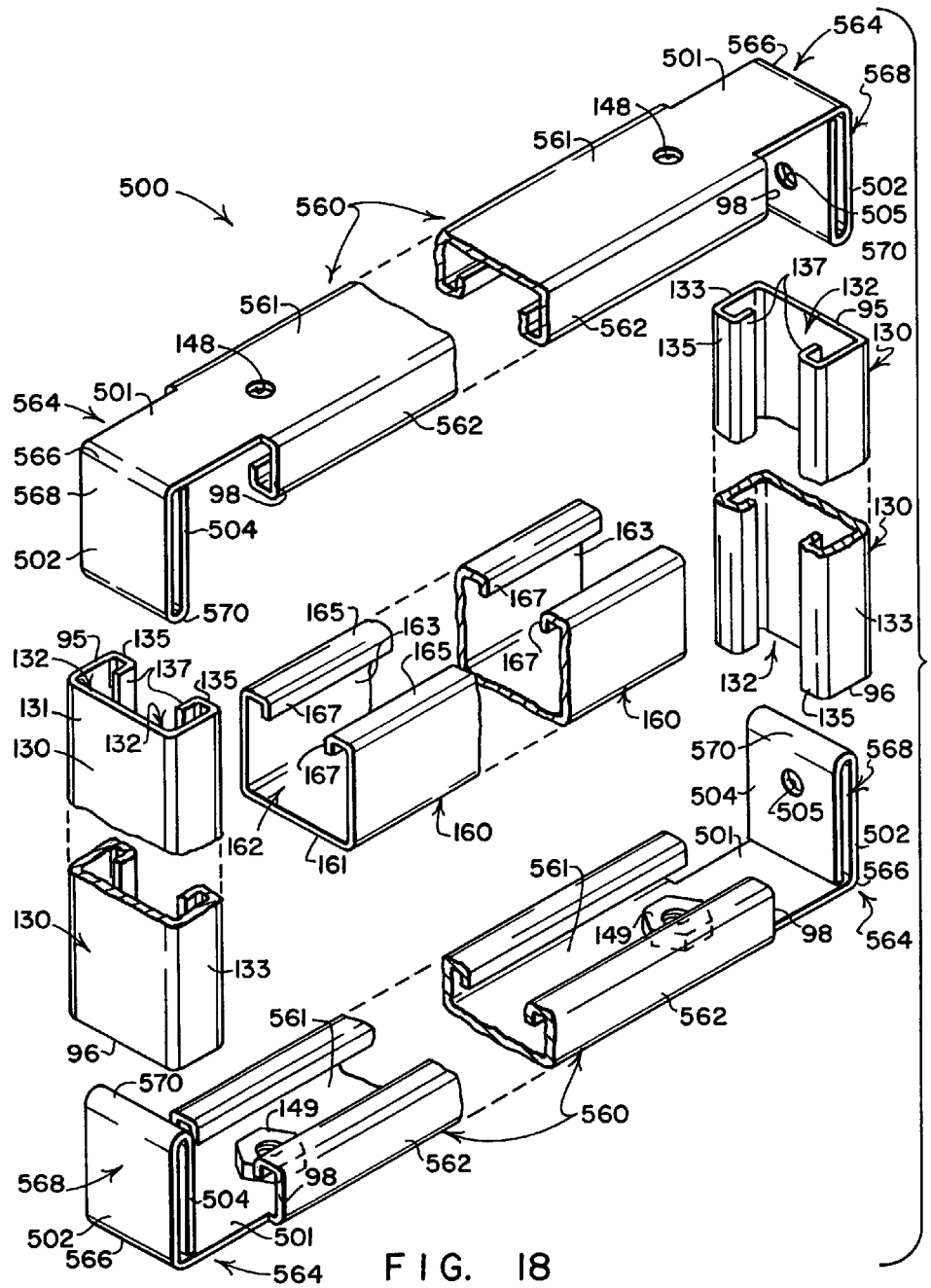
FIG. 18 is an exploded perspective view showing selected elements of a component set embodying features of the present invention.

Referring to FIG. 18, the component set 500 preferably includes the exact same elongate metal uprights 130 having the same channel-shaped cross-sections as have already been described and are shown in FIGS. 1-6, 9-12, and 16; and the exact same elongate metal connecting members 160 having the same channel-shaped cross-sections as have already been described and are shown in FIGS. 1, 9-11, 13, 14 and 16. As will be readily understood by those skilled in the art, the uprights 130 and the connecting members 160 can, of course, be of various lengths that depend on the dimensions of the particular utility trench structure within which the uprights 130 and the connecting members 160 are being utilized—hence these components are shown in FIG. 18 as being of indefinite length. Where the connecting members 160 are utilized, they are preferably attached to the uprights 130 in the manner that is depicted in FIGS. 9, 10 and 11, through the use of the L-shaped brackets 170 and other conventional, commercially available caps screws 176 (and nuts) or such connection elements 180 such as are shown in FIG. 17.

The component set 500 differs from the component set 100 in that the component set 500 includes (in addition to, or in place of connecting members 160, as circumstances may dictate), another type of connecting member which is indicated by the numeral 560. The connecting members 560 have elongate central regions 562 of channel-shaped cross-sections that preferably are, in all respects, identical to the channel-shaped cross-sections of the uprights 130.

However, each of the elongate connecting members 560 has identical opposed end regions 564 that include oppositely extending, substantially horizontal reaches or extensions 501 of the same material that forms a back wall 561 of the center section 562. The extensions 501 of the back wall 561 are not as wide as the back wall 561, but extend in the same plane as the back wall 561.

Substantially right angle bends 566 join the horizontal reaches or extensions 501 to depending form ations 568 that are sized and configured to be snugly received within the interiors 132 of the upper end regions 95 of the uprights 130. As those skilled in the art will readily understand, the depending formations 568 are carefully sized to slip snugly but with reasonable ease into the interiors 132 of the upper end regions 95 (preferably in spaces located between the back walls 131 and ends 185 of the in-turned walls 137—but spaces that are relatively wide in that they extend the full distance between the parallel-extending walls 133 of the uprights 130.

Referring to FIGS. 18 and 19, the depending formations 568 of the depicted connection member 560 each includes a first reach of material 502 that extends downwardly, and a substantially parallel-extending reach of material 504 that extends upwardly. An integral U-shaped bend 570 joins the downwardly and upwardly reaches 502, 504, respectively.

Figure 20:
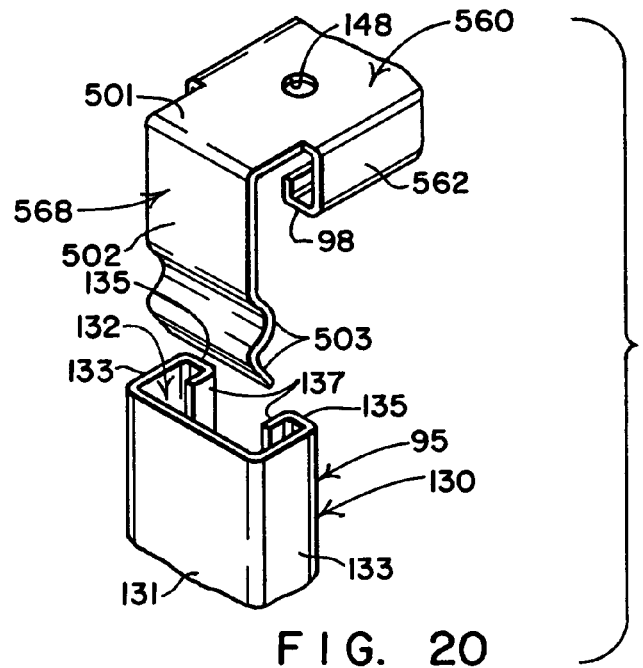
FIG. 20 is an exploded perspective view showing selected elements of another component set embodying features of the present invention.

As a practical matter, it is possible for the horizontal reaches or extensions of material 501 to be relatively long, as depicted in FIG. 19, or to be relatively short, as depicted in FIG. 20. If the horizontal reaches or extensions 501 are relatively short, as shown in FIG. 20, it is possible not only for the upper end region 95 of the associated upright 130 to extend upwardly into engagement with the horizontal reach or extension 501, but also for the walls 135 of the upper end region 95 of the upright 130 to be engaged by an end surface 98 of the channel-shaped central region 562 in the manner shown in FIG. 20.

Although only end portions of one of the uprights 130 and one of the connecting members 560 are shown in FIG. 19, it will be understood that end regions of both of the uprights 130 and of the connecting members 560 are identically configured and identically connected to provide quite a strong and relatively rigid set of components 500 well suited to maintaining a parallel-extending relationship between sheet metal side panels 110 that are connected to the component set 500.

The lower connecting member 560 which appears toward the bottom of FIG. 18 is shown with hex nuts 149 welded to the back wall 561 thereof. An identical one of the hex nuts 149 is also shown welded to a back wall 561 of the connecting member 560 that is shown in FIG. 19. The nuts 149 are engaged by the threaded fasteners 147 when the connection members 560 are employed as depicted in FIG. 19 to underlie and support the cover plate 140. The nuts 149 are positioned adjacent holes 148 that are formed through the back walls 561. The holes 148 are visible in FIGS. 18-22.

Referring to FIG. 19, to hold one of the end regions 564 properly in place once the depending formation 568 has been inserted into the interior 132 of the upper end region 95 of the upright 130, a cap screw 99 may be threaded into a hole 505 that is formed in the upwardly extending reach 504. Alternatively, the friction of a snug fit of the depending formation 568 which extends into the interior 132 of the upper end region 95 of the upright 130 may be sufficient to maintain the juncture of the connecting member 130 with the upright 130 without use of the cap screw 99.

Referring to FIG. 20, an alternate possible configuration of the depending formation 568 is shown that provides the depending reach of material 502 with a sinusoidal bend or an S-shaped formation 503 that is shaped and sized to be snugly received within the interior 132 of the upper end region 95 of the associated upright 130. By providing a sinusoidal bend or an S-shaped formation 503 on each of the depending reaches 502 at opposite ends of the connecting member 560, snug-fitting connections may be provided between the connecting member 560 and each of the uprights 130 of a component set 500.

Figure 21:
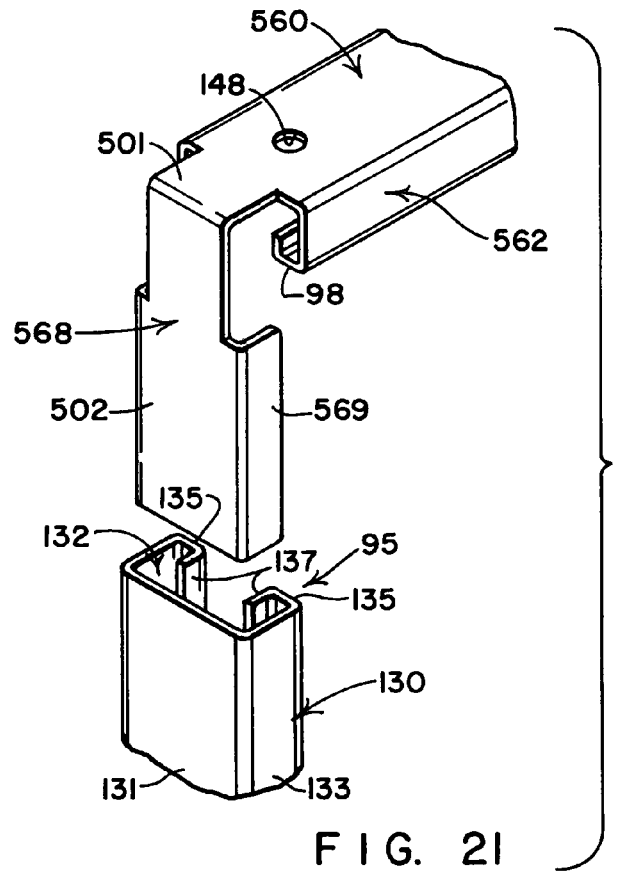
FIG. 21 is an exploded perspective view showing selected elements of another component set embodying features of the present invention; and, FIG. 22 is a sectional view similar to FIG. 19 showing how selected elements of a component set embodying features of the present invention may be assembled.

Referring to FIG. 21, still another possible configuration of the depending formation 568 (which is repeated on the opposite end of the connecting member 560) is shown that simply calls for the depending reach of material 502 to be provided with a pair of inwardly-turned, parallel-extending wall portions 569 that are configured to be received snugly within portions of the interior region 132 of an upper end region 95 of an associated upright 130 at locations adjacent the inturned walls 133 of the uprights 130.

Figure 22:
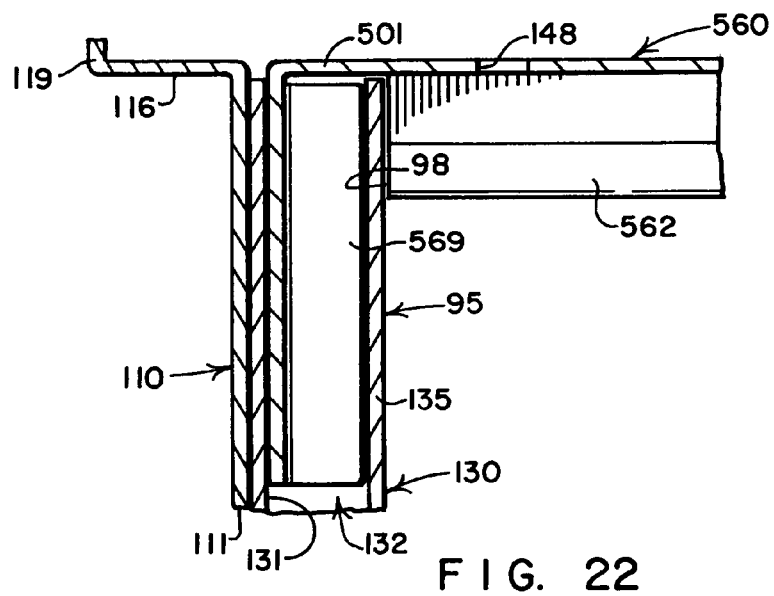

Referring to FIG. 22, it can be seen that the in-turned wall portions 569 can be positioned immediately adjacent the horizontally extending material reach 501. Also, the horizontally extending material reach 501 can be shortened (in the manner also shown in FIG. 21) so that the end 98 of the central region 562 actually abuts the upper end region 95 of the uprights 130 when the depending formation 568 of the depicted connecting member 560 is inserted as far as possible into the interior 132 of the upper end region 95 of the depicted upright 130.

As will be apparent from the foregoing description and from the accompanying drawings, the present invention provides several slightly different component sets 100 and 500 that can be positioned at spaced intervals along the lengths of utility trench sections to maintain the substantially parallel-extending relationship of such upstanding sheet metal side panels 110 as may be employed in the formation of utility trench sections. Moreover, the disclosed component sets include a variety of connecting members 150, 160, 560 that each employ identical end regions that are well-suited to extend into and to be snugly received within the interiors 132 of, or to snugly grip, pairs of uprights 130 that are bridged between by the various described connecting members 150, 160, 560.

Versatility is provided by the disclosed component sets 100, 500 in that substantially any needed number of the connecting members 160 shown in FIG. 1, and upper and lower connecting members 560 shown in FIG. 18 can be employed to mount a plethora of pipe, tubes and conduits 200, 210, 220 within relatively deep utility trenches that are formed using appropriately tall side panels 110.

Further features that add to the versatility of the disclosed component sets 100, 500 reside in their use of relatively inexpensive, elements having channel-shaped cross-sections to form not only the connecting members 160, 560 but also the uprights 130, all of which can receive and provide points of attachment for conventional, commercially available pipe clamp brackets such as are indicated in FIGS. 9, 10 and 11 by the numerals 202, 212 and 222, respectively. Other types of conventional, commercially available pipe clamp brackets (not shown) also can be used to attach particularly smaller diameter pipes (than the pipes, tubes and conduits 200, 210, 200 that are depicted in FIGS. 9, 10 and 11) to the uprights 130 and to various ones of the connecting members 160, 560.

Although identical upper and lower connecting members 560 are shown in FIG. 18 that have vertically extending portions 568 configured to be snugly received within the open upper and lower end regions of the uprights 130, respectively, not all installers of utility trench sections will want to employ the lower connecting member 560. Some installers will make at least some use of the lower connecting members 560, perhaps by setting the lower connecting members 560 atop bricks or other solid members (not shown) to properly position a utility trench section at a correct elevation so the uppermost portions 119 of the top formations 116 are at exactly correct heights, at a level to be equalled by a top surface of a concrete floor (now shown) that is to be poured exteriorly of the utility trench being constructed.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended to protect whatever features of patentable novelty that exist in the invention disclosed.

What is claimed is:

1. An elongate utility trench section having opposite end regions configured to be connected to end regions of other adjacently positioned utility trench sections to form a below-floor-level utility trench in which elongate tubular members such as pipes, tubes and conduits can extend from place to place along the utility trench, comprising:
   a) a pair of sheet metal side panels configured to extend along the length of the elongate utility trench section to define opposed, substantially parallel-extending, upstanding sidewalls of the utility trench section;
   b) a set of components interposed between the pair of sheet metal side panels at a selected location along the length of the elongate section, including a pair of substantially identical, elongate, metal uprights that are of substantially uniform channel-shaped cross-section along substantially the full lengths of the uprights, with each of the uprights having a back wall that extends between an upper end region and a lower end region of the upright, and with each of the uprights being connected to a different one of the sheet metal side panels;
   c) with the set of components also including an elongate, one-piece, upper connecting member that extends transversely between and connects the upper end regions of the two metal uprights, with the upper connecting member having opposite end regions that extend snugly into interiors of the upper end regions of the metal uprights; and,
   d) with the set of components also including an elongate, one-piece, second connecting member that extends transversely between and connects with the two metal uprights at a height along the uprights beneath the location of the upper connecting member, with the second connecting member having opposite end regions each coupled by a separate connector to a different one of the two metal uprights, and in which the separate connectors have tooth formations that engage and bite into the metal of the uprights to form slip-resistant connections between the second connecting member and the two uprights.

2. The elongate trench section of claim 1 in which the upper connecting member is formed from a single piece of metal, has an elongate central region of channel-shaped cross-section extending transversely between the upper end regions of the two uprights, and has substantially identically configured end regions each configured to overlie a portion of, to depend into, and to be snugly received within the upper end region of a different one of the two uprights.

3. The elongate trench section of claim 2 in which the channel-shaped cross-section of the central region opens downwardly toward the second connecting member, and the second connecting member is a single piece of metal having a channel-shaped cross-section extending along substantially the full length thereof that opens upwardly toward the central region of the upper connecting member.

4. The elongate trench section of claim 3 in which the channel-shaped cross-sections of the substantially identically configured uprights open toward each other.

5. The elongate trench section of claim 1 in which the connectors have teeth, and each connector also has an internally threaded portion into which a threaded fastener extends that can be tightened to force the teeth of the associated connector to bite into the metal of an associated one of the two uprights.

6. The elongate trench section of claim 1 in which each of the opposite end regions of the upper connecting member includes a depending U-shaped formation with a downwardly extending and an upwardly extending reach of metal that each are snugly received within an interior of the upper end region of a different one of the uprights.

7. The elongate trench section of claim 1 in which each of the opposite end regions of the upper connecting member includes a depending formation of substantially S-shape configured to be snugly received within an interior of the upper end region of a different one of the uprights.

8. The elongate trench section of claim in which each of the opposite end regions of the upper connecting member includes a depending formation that has spaced parallel-extending walls configured to be received within an interior of the upper end region of a different one of the uprights.

9. The elongate trench section of claim 1 additionally including an elongate metal cover plate that overlies at least an upwardly-opening part of the utility trench, and at least one threaded fastener that extends through a hole formed in the cover plate and is threaded into an opening defined by the upper connecting member.

10. The elongate trench section of claim 1 additionally including two sets of attachment elements each configured to fasten a separate end region of the second connecting member to a different one of the uprights at a chosen height location along the length thereof.

11. A method of forming a continuous length of a utility trench, comprising the steps of providing a plurality of elongate sections as defined by claim 1, arranging the elongate sections end-to-end, and fastening adjacent ends of the elongate sections together to define a continuous utility trench length.

12. The method of claim 11 wherein at least one of the elongate sections has a component set positioned along the length thereof as defined by claim 1.

13. An elongate utility trench section having opposite end regions configured to be connected to end regions of other adjacently positioned utility trench sections to form a below-floor-level utility trench in which elongate tubular members such as pipes, tubes and conduits can extend from place to place along the utility trench, comprising:
   a) a pair of sheet metal side panels configured to extend along the length of the elongate utility trench section to define opposed, substantially parallel-extending, upstanding sidewalls of the utility trench section;
   b) a set of components interposed between the pair of sheet metal side panels at a selected location along the length of the elongate section, including a pair of substantially identical, elongate, metal uprights that are of substantially uniform C-shaped cross-section along substantially the full lengths of the uprights, with each of the uprights having a back wall that extends between an upper end region and a lower end region of the upright, and with each of the uprights being connected to a different one of the sheet metal side panels;
   c) with the set of components also including an elongate, one-piece, upper connecting member of substantially uniform C-shaped cross-section that extends transversely between and connects the upper end regions of the two metal uprights, with the upper connecting member having opposite end regions that overlie portions of and depend snugly into interiors of the upper end regions of the metal uprights; and, d) with the set of components also including an elongate, one-piece, second connecting member of substantially uniform C-shaped cross-section that extends transversely between and connects with the two metal uprights at a height along the uprights beneath the location of the upper connecting member, with the second connecting member having opposite end regions each coupled by a separate connector to a different one of the two metal uprights.

14. The elongate trench section of claim 13 in which the separate connectors have tooth formations that engage and bite into the metal of the uprights to form slip-resistant connections between the second connecting member and the two uprights.

15. The elongate trench section of claim 13 in which the upper connecting member is formed from a single piece of metal, has an elongate central region of C-shaped cross-section extending transversely between the upper end regions of the two uprights.

16. The elongate trench section of claim 15 in which the C-shaped cross-section of the central region opens downwardly toward the second connecting member, and the second connecting member is a single piece of metal having a C-shaped cross-section extending along substantially the full length thereof that opens upwardly toward the central region of the upper connecting member.

17. The elongate trench section of claim 16 in which the C-shaped cross-sections of the substantially identically configured uprights open toward each other.

18. The elongate trench section of claim 13 in which the connectors have teeth, and each connector also has an internally threaded portion into which a threaded fastener extends that can be tightened to force the teeth of the associated connector to bite into the metal of an associated one of the two uprights.

19. The elongate trench section of claim 13 in which each of the opposite end regions of the upper connecting member includes a depending U-shaped formation with a downwardly extending and an upwardly extending reach of metal that each are snugly received within an interior of the upper end region of a different one of the uprights.

20. The elongate trench section of claim 13 in which each of the opposite end regions of the upper connecting member includes a depending formation of substantially S-shape configured to be snugly received within an interior of the upper end region of a different one of the uprights.

21. The elongate trench section of claim 13 in which each of the opposite end regions of the upper connecting member includes a depending formation that has spaced parallel-extending walls configured to be received within an interior of the upper end region of a different one of the uprights.

22. The elongate trench section of claim 13 additionally including an elongate metal cover plate that overlies at least an upwardly-opening part of the utility trench, and at least one threaded fastener that extends through a hole formed in the cover plate and is threaded into an opening defined by the upper connecting member.

23. The elongate trench section of claim 13 additionally including two sets of attachment elements each configured to fasten a separate end region of the second connecting member to a different one of the uprights at a chosen height location along the length thereof.

24. The elongate trench section of claim 13 in which the C-shaped cross-section of the metal uprights is defined by the back wall, a first pair of walls that are each joined to and extend perpendicularly way from the back wall, and a second pair of walls that are each joined to and extend perpendicularly from one of the walls of the first pair of walls towards each other in a common plane that parallels the back wall.

25. The elongate trench section of claim 24 in which the C-shaped cross-section of the metal uprights is further defined by a third pair of walls that are each joined to and extend perpendicularly from one of the walls of the second pair of walls towards the back wall.

26. A method of forming a continuous length of a utility trench, comprising the steps of providing a plurality of elongate sections as defined by claim 13, arranging the elongate sections end-to-end, and fastening adjacent ends of the elongate sections together to define a continuous utility trench length.

27. The method of claim 26 wherein at least one of the elongate sections has a component set positioned along the length thereof as defined by claim 13.

* * * * *